United States Patent [19]

Kulischenko

[11] 4,185,474
[45] Jan. 29, 1980

[54] SAFEGUARD COUPLING FOR POWER DRIVEN FLEXIBLE SHAFTS

[75] Inventor: Walter Kulischenko, East Brunswick, N.J.

[73] Assignee: Pennwalt Corporation, Philadelphia, Pa.

[21] Appl. No.: 892,630

[22] Filed: Apr. 3, 1978

[51] Int. Cl.² ............................ F16C 1/06; F16C 1/26
[52] U.S. Cl. ................................................ 64/4; 64/3; 64/2 R; 433/112
[58] Field of Search ................. 64/2 R, 3, 4; 175/140; 32/59, 26

[56] References Cited

U.S. PATENT DOCUMENTS

| | | | |
|---|---|---|---|
| 2,377,271 | 5/1945 | Schumann | 64/4 |
| 2,586,369 | 2/1952 | Mall | 64/2 R |
| 2,801,530 | 8/1957 | Holt | 64/3 |
| 3,190,084 | 6/1965 | Moon | 64/3 |
| 3,372,560 | 3/1968 | Dalton | 64/4 |
| 3,587,248 | 6/1971 | Umanos | 64/4 |

FOREIGN PATENT DOCUMENTS

| | | | |
|---|---|---|---|
| 1052832 | 1/1954 | France | 32/59 |
| 1107414 | 8/1955 | France | 32/59 |

Primary Examiner—Ronald H. Lazarus
Assistant Examiner—R. C. Turner
Attorney, Agent, or Firm—Arthur M. Suga

[57] ABSTRACT

A device for coupling power from a high speed rotating flexible shaft to a spindle of a portable worktool. The flexible shaft is contained within a casing. The casing is crimped within a ferrule which is threaded into a handpiece which an operator holds in one hand to guide the worktool. Upon movement of the worktool on the workpiece by the operator, the casing becomes twisted to encourage loosening of the threaded connection between the ferrule and handpiece, thus endangering the operator. In lieu of the prior art threaded connection between the ferrule and handpiece, a retaining member engages both to prevent their dangerous separation by virtue of the handpiece and retaining member being free to slowly rotate about the ferrule in a direction to automatically relieve twisting stresses introduced into the casing caused by movement of the worktool by said handpiece on or about a workpiece.

2 Claims, 3 Drawing Figures

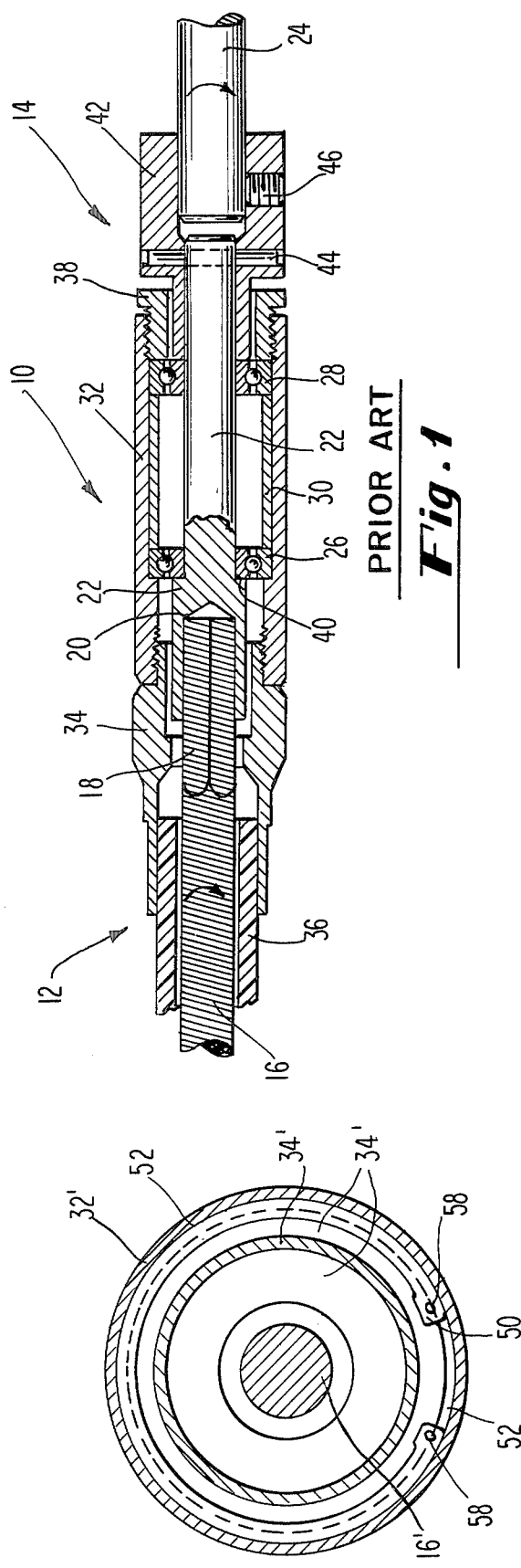
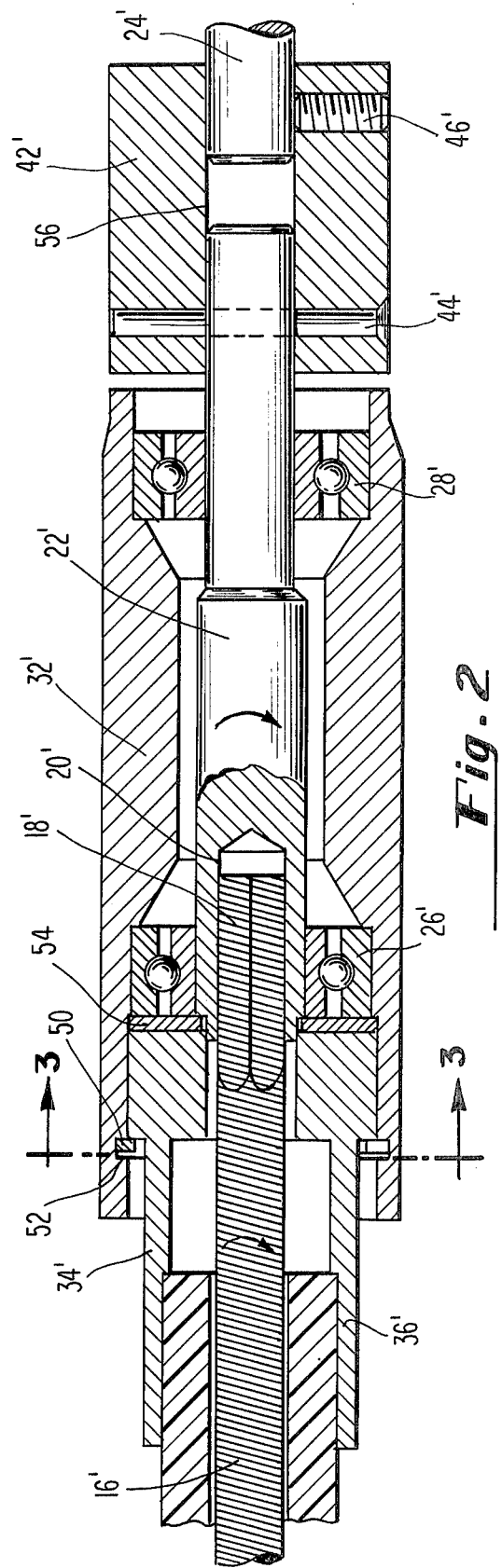
Fig. 1 PRIOR ART
Fig. 2
Fig. 3

SAFEGUARD COUPLING FOR POWER DRIVEN FLEXIBLE SHAFTS

STATEMENT OF THE INVENTION

This invention relates to flexible shafts and more particularly to improved couplings for use with power driven flexible shafts which permit the flexible shaft casing to remain unstressed even when the driven member or handpiece is moved about the workpiece in such a way which subjects the casing to twisting movements.

BACKGROUND OF THE INVENTION

Flexible shafts comprise basic elements of power transmission and are designed to transmit power or control from a driving element to an element to be driven. Transmission may be over, under, or around obstacles or objects where transmission by solid shafts would be impractical or impossible.

In a typical rotatable flexible shaft, a wire mandrel has a plurality of layers of closely coiled wire wound thereover, each of the layers being successively wound over another in alternately opposing directions, i.e., right or left-hand lay. This shaft is usually covered by a flexible casing, metallic or covered, and a clearance between the shaft and casing is provided in order that the shaft may rotate freely within the casing.

Rotatable flexible shafts are of two basic types—power driven and remotely controlled. Power driven flexible shafts are designed primarily for motor-driven or high speed operation in one direction. Remote control flexible shafts, on the other hand, are designed primarily for hand-operated control in either direction.

Power driven flexible shafts have two general classes of application—those in which the shaft operates in a given position and the curve, or curves, of the shaft remain substantially fixed; and those in which there is relative movement between the driving and driven elements, and the curvature and twisting of the shaft is continually changing, as when, for example, a driven element such as a portable grinding tool is continuously moved about the workpiece by an operator. In such case, the prior art devices, which coupled the power driven rotating flexible shaft to the spindle of the grinding tool, were rigidly threadedly secured between the flexible shaft and spindle, and hence, were incapable of preventing twisting of the casing of the flexible shaft during grinding operations. Under such operating conditions, certain threaded connections employed in the prior art coupling devices often times loosened, such that the high speed flexible shaft rotating within the casing could cause injury to the operator.

The present invention overcomes the aforementioned deficiencies of the prior art by providing a safeguard coupling device which automatically relieves stresses introduced into the casing by twisting thereof caused by movement of the handpiece and worktool by an operator. Furthermore, even if the present inventive safeguard coupling device should malfunction, power to the handpiece or driven element is substantially instantly removed to lessen any danger of injury to the operator.

BRIEF DESCRIPTION OF THE DRAWINGS

FIG. 1 is a longitudinal sectional view of a typical prior art power driven rotatable flexible shaft coupling device.

FIG. 2 is a longitudinal sectional view of an embodiment of a power driven rotatable flexible shaft coupling device of the present invention.

FIG. 3 is a sectional view of the embodiment of FIG. 2 taken substantially along line 3—3 thereof.

DETAILED DESCRIPTION OF THE INVENTION

In FIG. 1, a coupling device 10 has an input or drive end 12 and an output or driven end 14. Drive end 12 includes a rotatable flexible shaft 16, one end of which is connected to a suitable power source (not shown) such as an electric motor, for example, and its other end formed into an accurate square 18 which is received within drive square 20 of coupling shaft 22. Coupling shaft 22 interconnects flexible shaft 16 with spindle 24 of a worktool. Coupling shaft 22 is rotatably supported within a pair of bearings, 26 and 28, suitably radial type, which bearings are separated by a spacer sleeve 30. Bearings 26 and 28 and sleeve 30 are received within a housing member or handpiece 32. Handpiece 32 threadedly receives ferrule 34 at the intput end of the coupling device. Ferrule 34 is swaged or crimped over casing 36 of the flexible shaft. A bearing retainer 38 is threadedly mounted to handpiece 32 at the output end of the coupling device. Coupling shaft 22 is provided with a collar 40 for positioning bearing 26 thereagainst.

Coupling nut 42, axially aligned with handpiece 32 and spaced therefrom, receives the output end of coupling shaft 22 which is held fast within the coupling nut by means of pin 44. Spindle 24 of the worktool is secured within coupling nut 42 through set screw 46.

In operation, the operator usually holds handpiece 32 with one or both hands. Since handpiece 32 is threadedly secured to ferrule 34 which is tightly crimped about casing 36, movement by the operator about the workpiece readily introduces undesirable twisting stresses in casing 36 which may cause loosening of the threaded connection between ferrule 34 and handpiece 32, resulting in possible injury to an operator of the worktool.

Further, the casing and flexible shaft will ordinarily be about 6 to 8 feet in length, and rarely over 15 feet. Such relatively short casing and shaft lengths helix easily when twisted. It is well known that a helixed or curved shaft will have a lower torque capacity than a straight shaft due to increased internal friction within the shaft itself as well as increased friction between the rotating shaft and casing.

In FIG. 2, a retaining ring 50 maintains the ferrule in relative position to the handpiece in lieu of the threaded connection therebetween. This structure permits the handpiece to automatically rotate in either direction while held by the operator to relieve any twisting stresses set up in the flexible shaft casing caused by movement of the handpiece.

Thus, ferrule 34' is tightly crimped around casing 36' of flexible shaft 16'. Flexible shaft 16' is provided with a square end 18' which is received within a mating drive square 20' in coupling shaft 22'. Shaft 22' is rotatable within ball bearings 26' and 28', both contained within handpiece 32'. Handpiece 32' is provided with an annular recess 52, shown in FIGS. 2 and 3, which receives retainer ring 50.

Ferrule 34' is permitted to free-float within the coupling device since retainer ring 50 exerts no resilient force thereagainst. Annular recess 52 is made slightly wider than width of retainer ring 50 to allow slight longitudinal movement of handpiece 32' relative to ferrule 34' as well as rotational movement of the handpiece as aforediscussed.

A washer 54, of brass or polytetrafluoroethylene, for example, is disposed between ferrule 34' and bearing 26'.

Coupling nut 42' has a central bore 56 which receives output end of coupling shaft 22' at one end and spindle 24' at its other end. Pin 44' and set screw 46' secure the coupling shaft and spindle respectively within the coupling nut.

Retainer ring 50 is snapped into recess 52 by means of a suitable tool which engages holes 58—58 provided in the retainer ring (FIG. 3). Retainer ring 50 may take shapes other than as shown but should not be of such width or shape which will prevent ferrule 34' from free-floating within the coupling device. Retainer ring 50 will rotate with handpiece 32' by virtue of a snap fit of the retainer ring within recess 52.

It should be apparent from the foregoing description that twisting of casing 36', during use, will have no deleterious effect on torque capacity of the flexible shaft; nor will the casing tend to twist or loop, which twisting or looping heretofore caused undesirable and dangerous loosening of threaded connections of the coupling device.

I claim:

1. In a coupling device for transmitting power from a rotating flexible shaft to a spindle of a worktool, said device having a handpiece for manually holding said worktool by an operator, a coupling shaft axially rotatably mounted within said handpiece for axially interconnecting said flexible shaft and said worktool spindle, said flexible shaft having a casing within which said flexible shaft rotates, a ferrule for tightly gripping one end of said casing and maintaining said flexible shaft in operable alignment with said coupling shaft and handpiece, the improvement therewith comprising ball bearing members disposed within said handpiece for operably axially rotatably mounting said coupling shaft, said ball bearing members comprising a ball bearing member at an input end of said coupling device and another ball bearing member at an output end of said coupling device, a washer disposed between said ferrule and said input end bearing member, an annular recess disposed at an input end of said handpiece, and retaining means engaged within said recess for retaining at least a portion of said ferrule within said handpiece whereby said handpiece and said retaining means will rotate together on a longitudinal axis about said portion of said ferrule within said handpiece in a direction to relieve twisting stresses introduced into said casing when said operator moves said worktool by said handpiece with respect to a workpiece.

2. The device of claim 1 wherein said washer is made of a material selected from the group consisting of brass and polytetrafluoroethylene.

* * * * *